June 7, 1949.  E. B. DIGBY  2,472,468
MACHINE FOR AUTOMATICALLY REMOVING
THE FEATHERS FROM FOWL
Filed Feb. 8, 1946  4 Sheets-Sheet 1
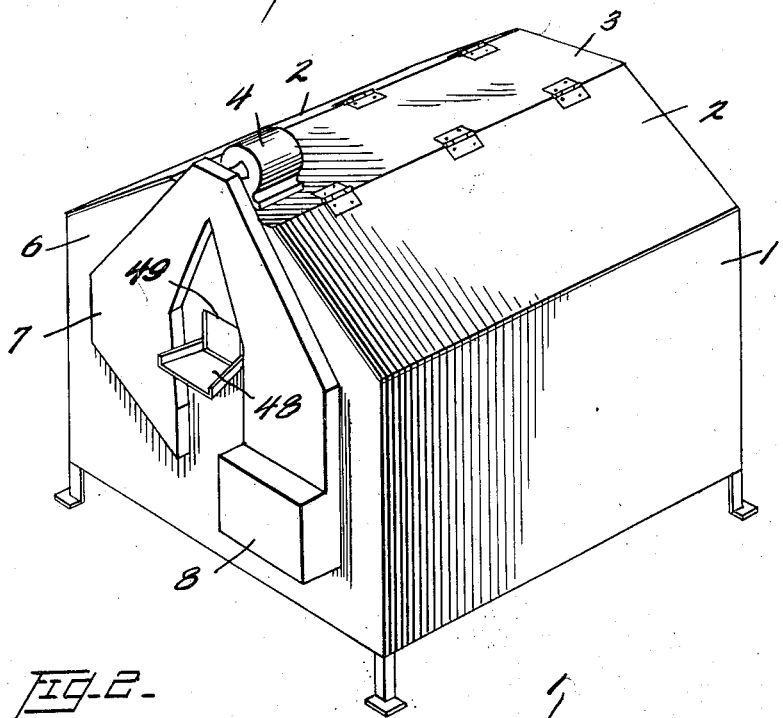
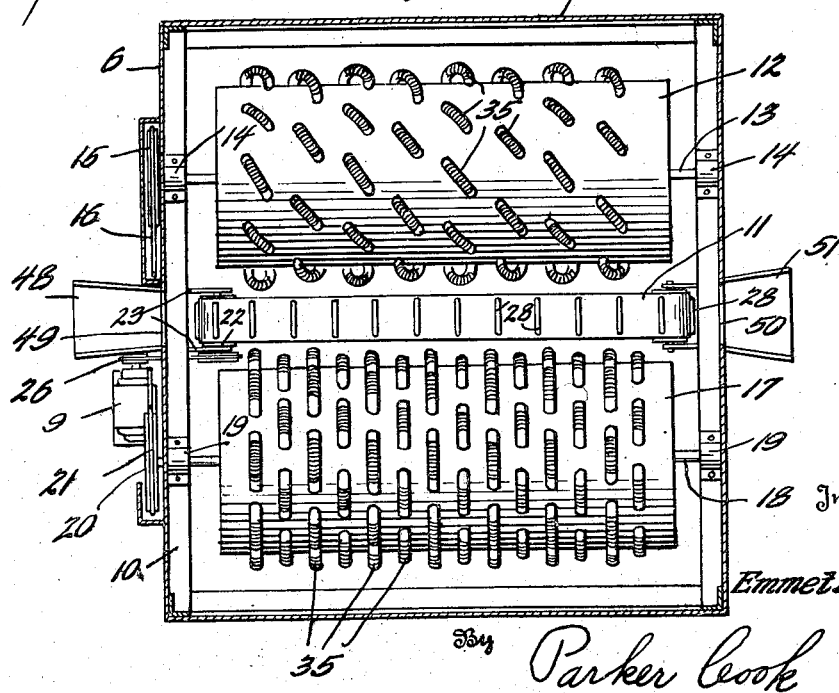
Inventor
Emmet B. Digby,
By Parker Cook Attorney

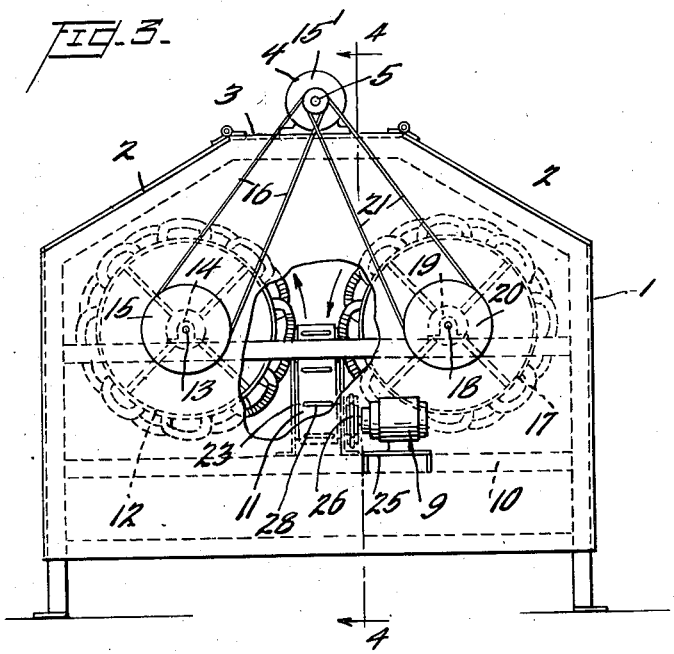

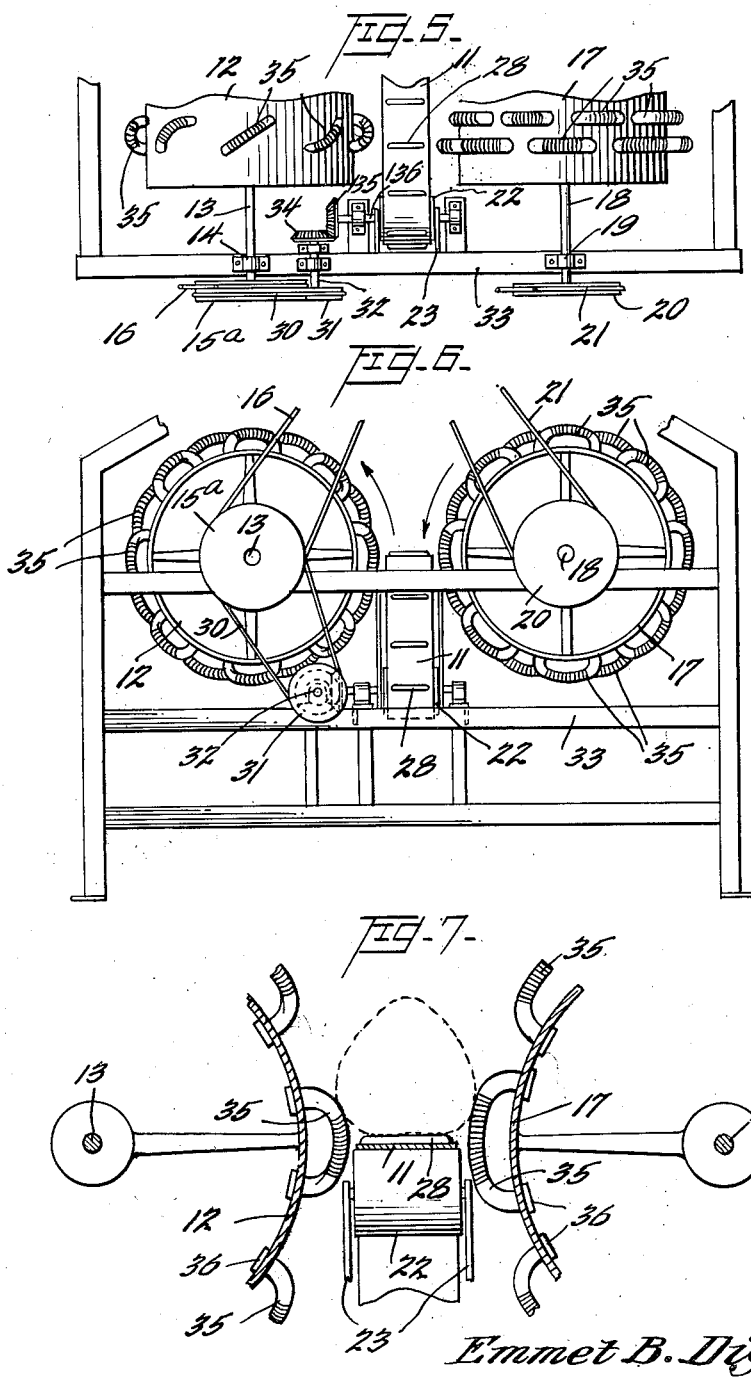

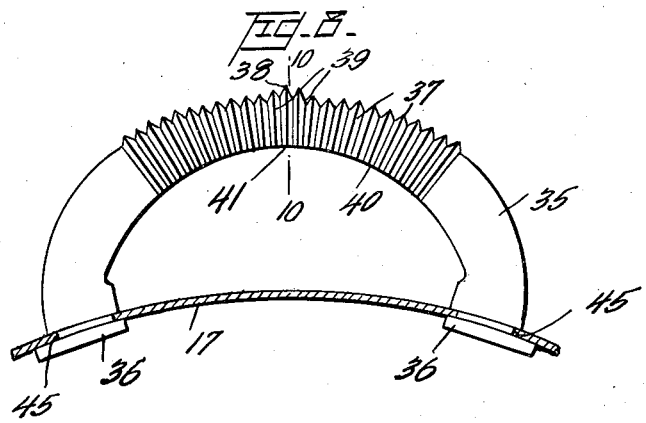
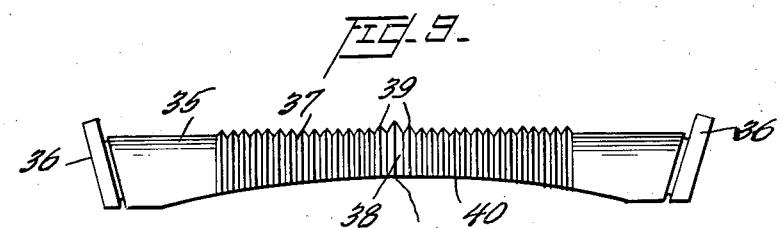
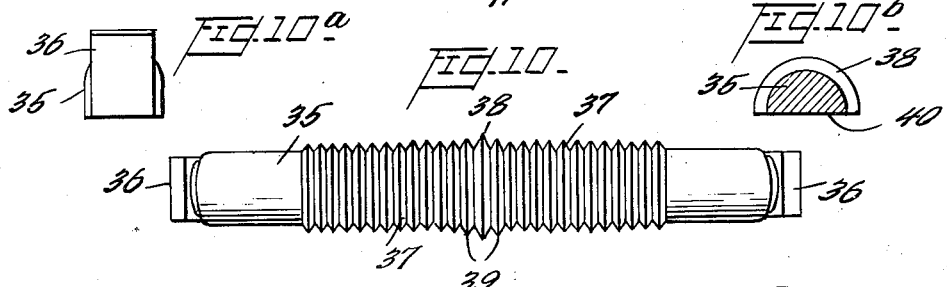
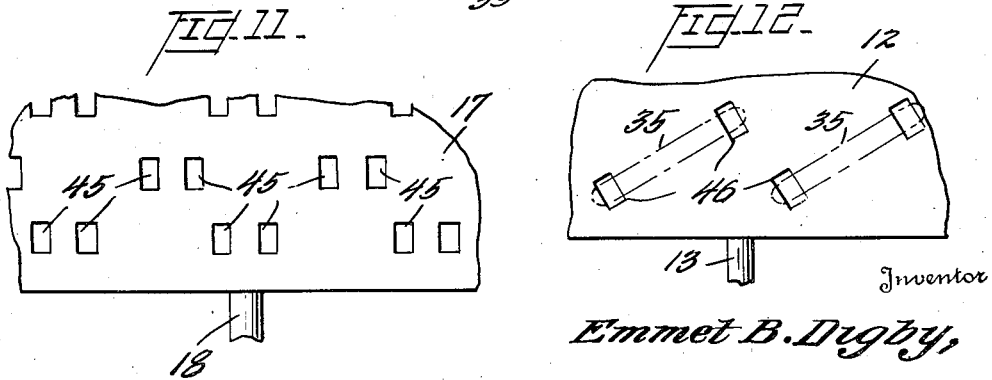

Patented June 7, 1949

2,472,468

UNITED STATES PATENT OFFICE 2,472,468

MACHINE FOR AUTOMATICALLY REMOVING THE FEATHERS FROM FOWL

Emmet B. Digby, Atlanta, Ga.

Application February 8, 1946, Serial No. 646,360

8 Claims. (Cl. 17—11.1)

My invention relates to new and useful improvements in a machine for plucking or removing the feathers from fowl, and, more particularly, to a machine wherein the fowl may be placed in the front end of the machine, and, as they pass through to the rear of the machine, the feathers will automatically be removed.

Another object of the present invention is to provide an automatic machine for removing the feathers from fowl, wherein the fowl do not have to be manually held by the operator against frictional members, but simply fed in the one end of the machine, where they are advanced and are automatically plucked to then pass out of the machine in their dressed condition.

In a co-pending application filed by me, on November 30, 1945, and bearing Serial No. 631,981, for a Poultry plucking machine, on which Patent No. 2,470,151 was issued on May 17, 1949, there is shown a rotary drum utilizing rubber rods disposed in an arcuate manner about the drum for plucking fowl, but it is necessary for the operator to hold the fowl in his hands and turn them over and over as he presses the same against these arched flexible rubber rods.

The present invention further contemplates using the same form of rods for the frictional or plucking members, and additionally, the provision of drums spaced on the opposite sides of a conveyor belt so that when the fowl are placed on the conveyor belt, the feathers will be subjected to the rubber rods and the fowl will also be automatically turned over and over sideways on the conveyor belt due to the contact of the fowl with the frictional elements; thus doing away with the necessity of the operator turning the birds over in his hands while he presses them against the frictional elements.

Still another object of the invention is to provide two drums with a plurality of rubber flexible rods spaced about the periphery of each drum, the rods on the one drum being positioned at an angle to the axis of rotation of its drum so that when the fowl are on the conveyor belt and contact with these angularly positioned flexible rods, the fowl will not only be tumbled over as they are fed forwardly through the machine, but also will have their ends forced against the rods, to thus thoroughly pluck these ends as well as the bodies of the fowl.

Still another object of the invention is to provide an automatic fowl plucking machine wherein two drums provided with certain forms of flexible frictional elements will rapidly and thoroughly remove the feathers from the fowl as they are carried on an endless conveyor belt between the drums; the fowl in turn being tumbled over and over, that is, from side to side, and also moved angularly with respect to their forward movement, so that the feathers will be well removed from about the bodies, the necks, from the tails, between the legs and also from beneath the wings.

Still another object of the invention is to provide a machine wherein all the outer surfaces of the fowl automatically will be exposed to the rubber frictional elements so that after the operator places the fowl in one end of the machine, they do not have to be touched thereafter by the operator until after they are completely plucked and dropped from the far end of the machine.

Still another object of the invention is to provide an automatic machine with two drums approximately four feet in length, while extending lengthwise of the drums and between the same is a conveyor belt, so that the machine will handle four medium size fowl at the one time (although larger or smaller size machines will operate equally as well) and will dress from eighteen to twenty chickens per minute.

Still another object of the invention is to provide an automatic machine wherein the drums, with their rubber rods, and the conveyor belt may be driven from the one motor, or, the machine may be made so that one motor will drive the aforesaid drums and a second motor utilized for simply driving the automatic conveyor belt.

Still another object of the invention is to provide an automatic machine for removing the feathers from the fowl wherein the drums and conveyor belt are housed in a stand or cabinet in which will be deposited the feathers, while on the outer facing of the housing or stand will be positioned the belts for operating the drums so that these feathers will not in any way interfere with the moving belts.

With these and other objects in view, the invention consists in certain new and novel arrangements and combination of parts as will hereinafter be more fully described and pointed out in the claims.

Referring now to the drawings showing a preferred embodiment, and one slightly modified form:

Fig. 1 is an outside view of the machine showing the stand or cabinet with a motor mounted on the top for operating the enclosed mechanism;

Fig. 2 is a horizontal sectional view showing the two drums, the endless conveyor belt, and the rubber frictional members mounted on the drums;

Fig. 3 is an end view with the guards removed and parts broken away showing the arrangements of the drums and the endless conveyor and the separate motor for operating the conveyor belt;

Fig. 4 is a longitudinal sectional view taken on line 4—4 of Fig. 3;

Fig. 5 is a fragmentary horizontal top plan view within the stand showing a slight modification wherein the conveyor belt is also driven by the rotary movement of a drum, which latter is driven from the one motor on top of the stand;

Fig. 6 is an end view of the same within the stand showing the conveyor belt driven by one of the drums (front plate removed);

Fig. 7 is an enlarged fragmentary sectional end view showing the rubber rods mounted in the peripheries of the drums with the interposed conveyor belt;

Fig. 8 is a side elevational view showing one of the rubber rods as attached to the drum;

Fig. 9 is a side view of a rod before being attached;

Fig. 10 is a top plan view of the rod before being attached;

Fig. 10a is an end view of the rod;

Fig. 10b is a sectional view taken on line 10—10 of Fig. 8;

Fig. 11 is a fragmentary detail view showing the receptive openings in the one drum for the rods; and Fig. 12 shows the receptive openings on the other of the drums, extending at an angle to the axis of rotation.

Referring now more particularly to several views and Figs. 1 to 3 for the moment, there may be seen the cabinet 1 having the hinged covers 2, while mounted on the top portion 3 may be seen an electric motor 4.

This motor 4 has its shaft 5 (see Fig. 3) extending out beyond the forward end plate 6 of the cabinet 1, so that belts 16 and 21 will respectively drive the two drums 12 and 17, all later to be mentioned.

On the forward plate 6 of the cabinet 1, I provide a guard 7 for the belts 16 and 21 and when two motors are used (as will also later be mentioned) the belt guard may be pressed outwardly as at 8 to also cover the second motor.

However, if only one motor is used, it will not be necessary to have the guard forced outwardly as at 8.

The purpose of putting the motor 4 at the forward end of the cabinet 1 and putting the belts 16 and 21 outside the cabinet is to prevent the pulley wheels, belts, etc., from being clogged by the feathers that are removed from the fowl.

As may be seen in Figs. 2, 3 and 4, (the preferred form) there is a separate motor 9 mounted in the cabinet 1 on a cross-brace 10 for operating the endless conveyor belt 11.

Referring now to Figs. 3, 4 and 5, and for the moment to Fig. 2, there will be seen a rotary drum 12 mounted on its shaft 13, which shaft is mounted in the forward and rearward bearings 14, while on the forward end of the shaft 13 and extending outwardly beyond the front of the cabinet plate 6 is a pulley wheel 15 with its belt 16 that is run from a double pulley wheel 15' mounted on the forward end of the shaft 5 of the motor 4.

Also, as may be seen from Figs. 2 and 3, there is a similar drum 17 supported on its shaft 18, the shaft in turn supported on the forward and rearward bearings 19 mounted in the stand, and this shaft 18 also has a pulley wheel 20 on its forward end that is operated by the aforementioned belt 21 also driven from the pulley wheel 15'.

In actual practice, I have found that drums of approximately four feet in length and nearly two feet in diameter will prove effective, although of course the length and the diameter may be changed if desired.

Extending longitudinally of the spaced drums 12 and 17 is the aforementioned conveyor belt 11 which is mounted on rollers 22 mounted in the forward and rearward brackets 23.

As heretofore mentioned, there is provided, in the preferred form, a separate motor 9 for running the endless conveyor belt 11 and this motor may be mounted on a shelf 25 on the outer side of the faceplate 6 of the cabinet. As shown there is a belt 26 for driving the shaft 27 which in turn will operate one of the rollers 22 to thus drive the conveyor 11.

The conveyor belt 11 may be provided with small cross bars or ridges 28 so that as the belt moves, the fowl will not have a tendency to slip back, and there may be also an idle pulley and weight assembly 29 or any desirable means to take up any slack that may occur in the conveyor belt 11.

It will be noticed that the conveyor belt, that is, its carrying face, extends substantially in the same horizontal plane as the central axes of the two aforementioned drums 12 and 17.

The two drums are preferably driven anti-clockwise by the motor 4, but as they are disposed on the opposite sides of the conveyor belt 11, the action from the frictional members (later to be described) will be in a downward direction on the one side of the belt and an upward action on the other side of the belt, thus tending to continuously roll the fowl over and over, from side to side, as they move forward on the conveyor belt 11.

In actual practice, the drums are turned at the rate of 300 R. P. M., and the speed of the conveyor belt is such that a fowl will travel from one end of the machine to the other in about twenty seconds, and as the machine will accommodate about four fowl, at the one time, it is possible to dress approximately seven hundred twenty an hour.

Of course, the speed of the conveyor belt 11 may be increased or decreased if necessary just so the fowl have their feathers completely removed by the time they pass out the far end of the machine, and I have dressed more than twelve hundred an hour with an increased speed.

By providing two separate motors 4 and 9, the rate of travel of the belt 11 can be regulated or changed without affecting the revolutions per minute of the drums. Whereas if one motor is used (as shown in the modified form) if it is desired to change the speed of the one and not the speed of the other, different gears would have to be installed.

It will be understood that I have not shown governors or controls for the motors but they may be in the control line to the motor.

Referring now for the moment to the modified form as shown in Figs. 5 and 6, rather than having a separate motor for the conveyor belt 11, I can utilize but one motor by installing a double pulley wheel 15a on the shaft 13 and use a belt 30 that extends to a pulley wheel 31 mounted on the forward end of shaft 32, the shaft in turn being mounted on the cross brace 33 of the cabinet 1.

On the inner end of the shaft 32 is the bevel gear 34 which in turn drives the mate 135 mounted on the shaft 136 which shaft drives a roller 22, which in turn drives the conveyor belt 11.

The only difference between the preferred and modified forms, therefore, is that in the one instance I provide two motors for the machine, that is, one to drive the rotary drums 12 and 17, and one to drive the conveyor 11; whereas in the modified form there is the extra belt 30 extending from one of the drums which in turn is arranged to drive the endless conveyor 11.

Referring now to the frictional elements for the drums as shown in detail in Figs. 8 to 10 inclusive, it might be mentioned that they are described in detail in my co-pending application filed November 30, 1945, and bearing Serial No. 631,981.

Briefly, they are preferably formed of relatively soft, flexible, rubber bars. They are all of the same size and dimension and interchangeable and thus a description of one is a description of all.

At the opposite ends of the rubber rod 35 are the enlarged pads or feet 36 which are alike but extend in the opposite angular direction. These pads or feet are rectangular in shape so that they can be placed in receptive, elongated sockets (later to be mentioned) formed in the drums, and then turned so that the rods will remain in place until removed by hand.

It will also be noticed that the rod or frictional element 35 is provided with a plurality of transverse ridges 37 which simulate screwthreads but are not in helical formation. It will also be noticed that centrally of the rod appears the highest ridge 38, while on the opposite side of the central ridge are the ridges 39 that are slightly higher than the ridges 37 but less in height than the central ridges 38.

In actual practice the angle of the ridges is sixty degrees (60°) so that relatively sharp surfaces are presented to the feathers in the plucking operation.

In actual practice, the rods are about eight inches (8") in length, and the transverse ridges occupy about five inches (5") of the rod so that a maximum of ridges or frictional surfaces may be presented against the irregular surface of the fowl.

It will be noticed that the rod is provided with a flat undersurface 40 while its upper surface is semicircular in formation. Also the rod is reduced in thickness on its undersurface, that is, from the ends to the middle and thus thinnest at its center 41. Then when the rod is in its arched attached position as shown in Fig. 8, the central portion is the portion that is most easily depressed or flattened when contacting with the fowl.

It will be understood that in the co-pending application, showing an identical form of rod, the rods were depressed by the operator forcing the fowl against them as the drum revolved.

In the present instance, however, the rods 35, of course, are depressed due to the fact that the body and feathers of the fowl extending beyond the sides of the conveyor belt 11 will contact with these frictional elements or rods 35, and the weight of the fowl being tumbled or turned over sideways, will keep forcing these flexible members 35 inwardly towards the drum thus providing the necessary pressure for the frictional elements 35 to remove the feathers.

These rubber rods have a tendency to wear but due to the manner in which they are fitted in their sockets, as will now be explained, they are quickly and readily replaceable.

Referring for the moment to Fig. 11, which shows a fragmentary portion of the drum 17 and its shaft 18, there will be noticed a plurality of rectangular openings 45, which are arranged in rows about the drum throughout its length, and in staggered relation.

It will be noticed that the long dimension of each of the openings 45 is parallel with the major axis of the drum. It is also to be mentioned that the length of the longer dimension of the opening is the same as the longer dimension of the pads 36 on the ends of the rubber rods 35, and, of course, the shorter dimension of the openings is less in length than the length of these feet or pads 36.

Thus to secure the rubber rods 35 in place, it is only necessary to first insert the long dimension of the pad 36 through the long dimension of a rectangular opening 45, and then swing the rod so that the long dimension of the pad 36 extends beyond the wall defining the short dimension of the socket or opening. Then the foot on the opposite end of the rod 35 is inserted in the same manner in its opening 45 so that both pads or feet will then extend out beyond the walls defining the short dimensions of the openings 45 as may be seen in Fig. 8.

After the rods 35 are thus secured to the drum they will remain in this position until they are worn through, after which the ends may be quickly turned and removed and new ones inserted.

By staggering the openings 45 as shown in Fig. 11, it will be understood that the center of one rod 35 will appear opposite the ends of the rods in the adjacent row as may be seen in Fig. 2, so that the fowl after they are once placed in the machine will at all times be subjected to the frictional action of the ridges upon these rods 35.

The manner of attaching the rubber rods to the other drum 12 is exactly the same, but in this instance it will be noticed that the sockets or openings 46 extend at an angle from the axis of rotation of the drum so that when the rubber rods 35 are in place as shown in Fig. 2 they will extend at an angle to the axis of rotation and cause the fowl to shift longitudinally as they are carried along the conveyor.

This shifting, of course, will permit the frictional elements to clearly remove the feathers about the opposite ends of the fowl.

It will be understood that it is not absolutely necessary that these rods on the one drum be set at an angle to the other, but I find that it has the advantages above mentioned. It will also be noticed that the receptive sockets or openings 45 and 46 are so spaced that when the rods 35 are in place, they will appear in an arched position as shown in Figs. 3, 6, 7 and 8, and thus will be flattened or depressed on contact with the fowl.

This is highly desirable as if the frictional members 35 were too rigid or stiff or non-depressible, these elements might tend to tear the skin of the fowl, besides removing the feathers.

As heretofore mentioned, there is normally great wear on the rubber rods 35, but by forming the ends as shown and the receptive sockets as shown, it is but a matter of moments to remove a worn rod and substitute a new one.

Finally as may be seen in Fig. 1, there is provided a shelf 48 in the front panel 6 of the cabinet just beneath the entrance 49 which is directly in front of the conveyor belt 11, and likewise there is an exit 50 in the rear plate and also a small shelf or trough 51.

Operation

The operation of the machine is exceedingly simple. In the preferred form, it is only necessary to start the two motors 4 and 9 to start the drums revolving in the same direction and to start up the endless conveyor belt 11. The operator will then feed the fowl through the opening 49 into the machine so that they will fall on the endless conveyor and where they will be tumbled and turned (in a sidewise direction) by the upward movement of the rods 35 on the drum 12 to the left of the conveyor belt, Fig. 3, and in a downward direction by the rods 35 on the drum 17.

Also the angularity of these frictional elements 35 on the drum 12 will cause the fowl to shift longitudinally, thus not only thoroughly removing the feathers from the bodies of the fowl, but also from their opposite ends, under the wings, between the legs, etc.

If the modified form is used, of course, there will only be one motor to start, but the operation is identical.

From the foregoing it will be seen that I have provided an automatic fowl-plucking machine wherein it is only necessary to feed the fowl to the endless conveyor and when they emerge from the opposite end of the machine all of the large and small feathers, including the pin feathers, will have been frictionally removed.

This saves considerable time over a machine where the operator has to turn, twist and revolve the fowl in his hands while pressing them against the frictional elements.

It will also be understood that although I have shown one means of securing the frictional elements to the drums, other similar means might be used without departing from the spirit and scope of the invention.

Having thus described my invention, what I claim as new and desire to secure by Letters Patent is:

1. In a machine for automatically plucking feathers from fowl, two spaced longitudinally extending rotary members, an endless conveyor mounted in the space between the said rotary members and travelling longitudinally of the said rotary members, each rotary member provided on its outer surface with a plurality of elastic frictional means, the said elastic frictional means each provided with a plurality of transversely extending ridges, the said elastic means on one of the rotary members extending at an angle to the axis of the rotation of said rotary members, the said elastic frictional means being adapted to rotate the fowl about its longitudinal axis, and force the opposite ends of the fowl against the said frictional members and thereby remove the feathers from said fowl, and means for operating the said rotary members in a like direction and driving the endless conveyor.

2. In a machine for automatically plucking feathers from fowl, two spaced longitudinally extending rotary members, an endless conveyor mounted in the space between the said rotary members travelling longitudinally of the said rotary members, each provided on its outer surfaces with a plurality of elastic frictional means, the said elastic frictional means each provided with a plurality of transversely extending ridges of varying height, the said elastic means on one of the rotary members extending at an angle to the axis of the rotation of said rotary members, the said elastic frictional means being adapted to tumble the fowl about its longitudinal axis, and also force the opposite ends of the fowl against the said frictional members and thereby completely remove the feathers from said fowl, and means for operating the said rotary members in a like direction and driving the endless conveyor.

3. In a machine for automatically plucking feathers from fowl, two spaced longitudinally extending rotary members, an endless conveyor mounted in the space between the said rotary members and wide enough to support a fowl thereon each rotary member provided on its outer surfaces with a plurality of elastic frictional means, the said elastic frictional means each provided with a plurality of transversely extending ridges of varying height, the said elastic means on one of the rotary members extending at an angle to the axis of the rotation of said rotary members, and said elastic frictional means each being removably secured at their opposite ends in the respective rotary members, the said elastic frictional means being adapted to tumble the fowl about its longitudinal axis on said conveyor and also force the opposite ends of the fowl against the said frictional members and thereby completely remove the feathers from said fowl, and means for operating the said rotary members and the endless conveyor.

4. In a machine for automatically plucking feathers from fowl, including two spaced rotatable drums each of which is provided with pairs of apertures therein, the said pairs of apertures extending in circumferential rows about the drum and the pairs of apertures in the one drum being at an angle to the axis of rotation of said drum, flexible rods provided with means at their opposite ends for removably holding the rods in said apertures, an endless conveyor mounted in the space between the said drums and adapted to support the fowl and subject the same to the said rods to frictionally remove the feathers from said fowl, and driving means for the said drums and the said endless conveyor.

5. In a machine for automatically plucking feathers from fowl, including two spaced rotatable drums each of which is provided with pairs of apertures therein, the said pairs of apertures extending in circumferential rows about the drum, and the pairs of apertures in the one drum being at an angle to the axis of rotation of said drum, flexible rods provided with transversely extending ridges thereon, and also provided with means at their opposite ends for removably holding the rods in said apertures, each pair of apertures in the drum spaced so that the rods project from the surface of the drum in an arcuate manner, an endless conveyor mounted in the space between the said drums and adapted to support the fowl and subject the same to the said rods to thereby frictionally remove the feathers from said fowl, and driving means for the said drums and the said endless conveyor.

6. In a machine for automatically plucking feathers from fowl, including two rotatable drums, arcuately disposed elastic rods having their opposite ends mounted in the surfaces of said respective drums, the rods in one drum being mounted parallel with the path of rotation of the drum while the rods of the other drum are mounted at an angle to the axis of rotation of said drum, an endless conveyor for supporting and moving the fowl longitudinally of the drum, to thereby subject the fowl to the frictional action of said rods, the angularity of the rods on the one drum forcing the opposite ends of the fowl against the rods to thereby remove the feathers from the opposite ends of the fowl as well as from the body proper, and means for driving the drums and the endless conveyor.

7. In a machine for automatically plucking feathers from fowl, including two rotatable drums, arcuately disposed elastic rods having their opposite ends mounted in the surfaces of said respective drums, the rods in one drum being mounted parallel with the path of rotation of the drum while the rods of the other drum are mounted at an angle to the axis of rotation of said drum, an endless conveyor for supporting and moving the fowl longitudinally of the drum, to thereby subject the fowl to the frictional action of said rods, the angularity of the rods on the one drum forcing the opposite ends of the fowl against the rods to thereby remove the feathers from the opposite ends of the fowl as well as from the body proper, and means for driving the drums and additional means for driving the endless conveyor.

8. In a machine for automatically plucking feathers from fowl, including an endless conveyor, rotatable drums mounted on the opposite sides of said conveyor, elastic depressible frictional means mounted on said drums and adapted to rotate the fowl as it travels along the conveyor, the frictional means on one drum being mounted parallel with the path of rotation of the drum, while the frictional means of the other drum are mounted at an angle to the axis of rotation of said drum, to thus shift the ends of the fowl as it progresses and thereby completely remove the feathers from the ends of said fowl as well as the body proper.

EMMET B. DIGBY.

REFERENCES CITED

The following references are of record in the file of this patent:

UNITED STATES PATENTS

| Number | Name | Date |
| --- | --- | --- |
| 1,755,665 | Richards | Apr. 22, 1930 |
| 2,350,656 | Williamson | June 6, 1944 |
| 2,376,120 | Campbell et al. | May 15, 1945 |
| 2,429,628 | Johnson | Oct. 28, 1947 |